Patented Sept. 29, 1931

1,825,623

UNITED STATES PATENT OFFICE

KARL MIESCHER, OF BASEL, SWITZERLAND, ASSIGNOR TO THE FIRM SOCIETY OF CHEMICAL INDUSTRY IN BASLE, OF BASEL, SWITZERLAND

DERIVATIVE OF QUINOLINE CARBOXYLIC ACIDS AND PROCESS OF MAKING SAME

No Drawing. Application filed December 23, 1927, Serial No. 242,281, and in Germany May 3, 1926.

The present invention relates to new substituted basic derivatives of quinoline carboxylic acids useful in therapeutics, and it comprises the new compounds themselves and the process of making them.

The new products are obtained by causing an acid halide of an α-halogen-γ-quinoline-carboxylic acid to react with an alkylene-polyamine containing simultaneously at least one tertiary basic group and at least one amino group possessing at least one free hydrogen atom.

There are thus obtained for instance from α-chloro-γ-quinoline-carboxylic acid chloride and diethylethylenediamine the α-chloro-γ-quinoline - carboxylic acid diethyl - amino-ethylene-amide (Formula I.) and from this, by treatment with sodiummethylate in the presence of a solvent, or with an aqueous methyl alcohol solution of an alkali, or with other hydrohalic binding agents the α-methoxy-γ-quinoline-carboxylic acid diethyl-amino-ethylene-amide (Formula II.)

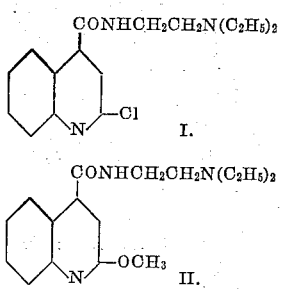

The term "α-halogen-γ-quinoline carboxylic acid" used throughout this specification includes any of its nucleal substitution derivatives.

The new bases yield neutral salts soluble in water; they are characterized by their high therapeutic activity.

The following examples illustrate the invention, the parts being by weight:

I. BASIC CHLOROQUINOLINE-CARBOXYLIC ACID DERIVATIVES

Example 1

A benzene solution of 2.2 parts of α-chloro-γ-quinoline-carboxylic acid chloride is gradually mixed, while cooling, with 2.3 parts of unsymmetrical diethylethylenediamine. When the reaction is at an end the solution is washed with water and the new base extracted by means of hydrochloric acid. The base is precipitated by means of sodium carbonate and extracted with benzene. The solvent is distilled and the base recrystallized from petroleum ether. The α-chloro-γ-quinoline-carboxylic acid-diethyl-amino-ethylene-amide of the formula

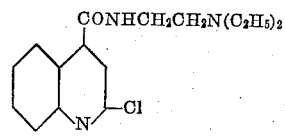

forms colorless lamina crystals of melting point 74° C. It is easily soluble in most organic solvents. With acids the base forms neutral salts soluble in water.

Example 2

Into a solution of 1.5 parts of triethylethylenediamine (colorless base boiling at 160–165° C. and obtained by reducing the condensation product, boiling point 40° under 7 mm. pressure, from unsymmetrical diethylethylenediamine and acetaldehyde) in 4 parts of caustic soda solution of 10 per cent. strength is run gradually, while stirring and cooling, a benzene solution of 2.2 parts of α-chloro-γ-quinoline-carboxylic acid chloride. When the reaction is finished the solution is washed with water and the solvent distilled. The α-chloro-γ-quinoline-carboxylic acid-diethyl-amino-ethylene-ethyl-amide of the formula

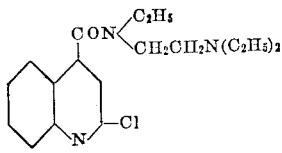

is a yellowish oil boiling at 165° C. at about 0.015 mm. pressure. In organic solvents it is freely soluble; with acids the base yields neutral salts soluble in water.

Example 3

To 5 parts of piperazine hydrate in 10 parts of water are added, while cooling, 3.3 parts of dimethylsulphate; caustic soda solution is added and there is run in gradually a benzene solution of 5.6 parts of α-chloro-γ-quinoline-carboxylic acid chloride. The crystalline magma which separates is extracted with dilute acid. Secondarily formed bis-(α-chloro-γ-quinoline-carboxylic acid)-piperazide remains undissolved. The acid solution is mixed with dilute sodium carbonate solution, whereby the new base is precipitated in crystalline form. The α-chloro-γ-quinoline-carboxylic acid-N-methyl-piperazide of the formula

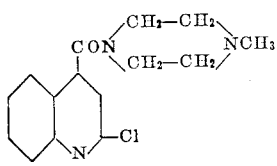

forms colorless crystals of melting point 208° C. It may be recrystallized from alcohol. In ether and benzene it is sparingly soluble; with acids the base yields neutral salts soluble in water.

In analogous manner may be made, for example:

α-chloro-γ-quinoline-carboxylic acid-diethyl-amino-penta-methylene-amide of the formula

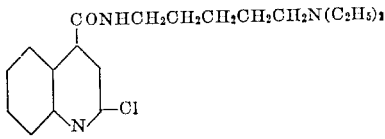

colorless crystals, of melting point 55° C.

α-chloro-γ-quinoline-carboxylic acid-piperidine-ethylene-amide of the formula

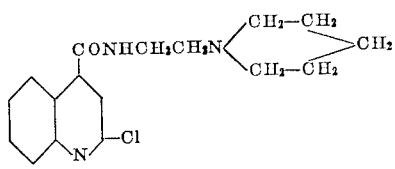

colorless crystals of melting point 147° C.

α-chloro-γ-quinoline-carboxylic acid-bis-(diethyl-amino-ethylene)-imide of the formula

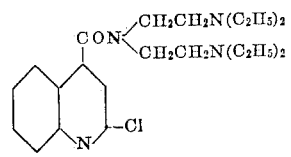

a yellowish oil of boiling point 165–170° C. at 0.01 mm. pressure.

The bis-(diethylaminoethyl)-imine is obtained, for example, from β-chloro-ethyldiethylamine and ammonia. It is a colorless oil of boiling point 105–110° C. under 8 mm. pressure.

II. Basic Alkoxyquinoline-Carboxylic Acid Derivatives

Example 4

15 parts of α-chloro-γ-quinoline-carboxylic acid-diethyl-amino-ethylene-amide are boiled with a methyl alcohol solution of 2 parts of sodium hydroxide. The methyl alcohol is then distilled; the residue taken up with ether and washed with water. After separating the solvent there remains α-methoxy-γ-quinoline-carboxylic acid-diethyl-amino-ethylene amide of the formula

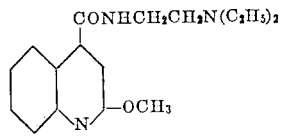

in the form of an oil which soon solidifies to colorless crystals. It can be recrystallized from petroleum ether and melts at 94° C. It is easily soluble in the usual organic solvents and yields with acids neutral salts soluble in water.

Example 5

A solution of 2.5 parts of sodium in n-butyl-alcohol is boiled with 30 parts of α-chloro-γ-quinoline-carboxylic acid-diethyl-amino-ethylene-amide in a reflux apparatus, and when the reaction is over the excess of butyl-alcohol is distilled. The remaining base is taken up with ether; the solution is washed with water and dried. The solvent is then distilled. The α-n-butoxy-γ-quinoline-carboxylic acid-diethyl-amino-ethylene-amide of the formula

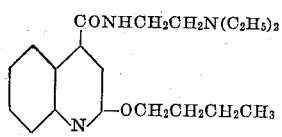

forms colorless crystals of melting point 64° C. It may be recrystallized from petroleum ether, whereas in other organic solvents it is freely soluble. With acids the base forms neutral salts soluble in water.

Example 6

2.5 parts of sodium are heated with 11 parts of cyclohexanol in 50 parts of toluene. When the reaction is over 30 parts of α-chloro-γ-quinoline-carboxylic acid-diethyl-amino-ethylene-amide are added and the whole is boiled for some time in a reflux apparatus. The solution is then washed with water and the solvent distilled. The α-cyclohexoxy-γ-quinoline-carboxylic acid-diethyl-amino-ethylene-amide of the formula

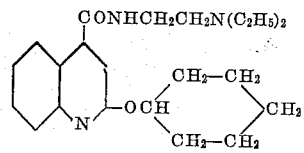

forms colorless crystals of melting point 69° C. It may be recrystallized from petroleum ether, whereas it is freely soluble in other organic solvents. With acids it forms neutral salts soluble in water.

Example 7

A xylene solution of 3 parts of α-chloro-γ-quinoline-carboxylic acid-diethyl-amino-ethylene-amide and 1.5 parts of sodium hydroquinone-mono-methyl-ether is boiled for some time. The solution is then washed with dilute caustic soda solution and the solvent distilled. The α-(para-methoxyphenoxy)-quinoline-carboxylic acid diethyl-amino-ethylene-amide of the formula

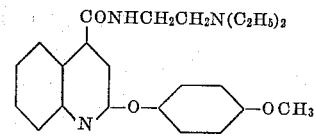

forms colorless crystals of melting point 108° C. It may be recrystallized from petroleum ether, whereas it is freely soluble in other organic solvents. With acids it forms neutral salts soluble in water.

Example 8

3 parts of α-chloro-γ-quinoline-carboxylic acid-diethyl-amino-ethylene-ethyl-amide are boiled in an alcoholic solution of 4 parts of sodium hydroxide. When the reaction is complete the alcohol is distilled and the base is dissolved in ether and the solution washed with water. After separating the solvent there is obtained the α-ethoxy-γ-quinoline-carboxylic acid diethyl-amino-ethylene-ethyl-amide of the formula

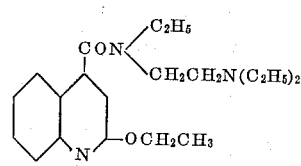

in the form of a yellowish oil of boiling point 158–160° C. at about 0.02 mm. pressure. It is freely soluble in organic solvents. With acids it yields neutral salts soluble in water.

Example 9

A solution of 2.3 parts of sodium in isoamyl alcohol is boiled with 30 parts of α-chloro-γ-quinoline-carboxylic acid-diethyl-amino-ethylene-ethyl-amide and when the excess of amyl-alcohol has been distilled the procedure of Example 8 is followed to isolate the product. The α-isoamoxy-γ-quinoline-carboxylic acid-diethyl-amino-ethylene-ethyl-amide of the formula

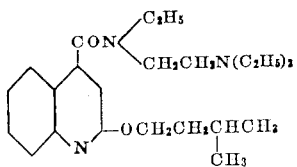

forms a yellowish oil of boiling point 165–168° C. at about 0.01 mm. pressure. It is freely soluble in organic solvents. The base yields with acids neutral salts soluble in water.

*Example 10*

1.2 parts of sodium are warmed in a toluene solution of 4 parts of n-butylalcohol. When the reaction is over there are added 20 parts of α-chloro-γ-quinoline-carboxylic acid-bis-(diethylamino-ethylene)-imide and the whole is boiled in a reflux apparatus. The toluene solution is then washed with water and the toluene distilled. The α-n-butoxy-γ-quinoline-carboxylic acid-bis-(diethylamino-ethylene)-amide of the formula

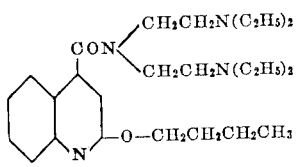

is a yellowish oil of boiling point 172° C. at about 0.008 mm. pressure. It is freely soluble in organic solvents. The base yields with acids neutral salts soluble in water.

*Example 11*

An alcoholic solution of 1 part of potassium hydroxide is boiled with 5 parts of α-chloro-γ-quinoline-carboxylic acid-N-methylpiperazide. The alcohol is distilled and the solid residue washed with water. By recrystallization from alcohol there is obtained the α-ethoxy-γ-quinoline-carboxylic acid-N-methylpiperazide of the formula

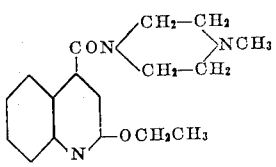

in the form of colorless crystals of melting point 183° C. In ether and cold alcohol it is sparingly soluble; more freely in warm alcohol. The base forms with acids neutral salts soluble in water.

In an analogous manner there may also be prepared, for example, the following bases:—

(1) α-ethoxy-γ-quinoline-carboxylic acid-diethyl-amino-ethylene-amide, colorless crystals of melting point 98° C.

(2) α-n-propoxy-γ-quinoline-carboxylic acid-diethyl-amino-ethylene-amide, colorless crystals of melting point 63° C.

(3) α-alloxy-γ-quinoline-carboxylic acid-diethyl-amino-ethylene-amide, colorless crystals of melting point 57° C.

(4) α-n-amoxy-γ-quinoline-carboxylic acid-diethyl-amino-ethylene-amide, colorless crystals of melting point 72° C.

(5) α-isoamoxy-γ-quinoline-carboxylic acid-diethyl-amino-ethylene-amide, colorless crystals of melting point 35° C.

(6) α-n-heptoxy-γ-quinoline-carboxylic acid-diethyl-amino-ethylene-amide, colorless crystals of melting point 66° C.

(7) α-benzoxy-γ-quinoline-carboxylic acid-diethyl-amino-ethylene-amide, colorless crystals of melting point 119° C.

(8) α-phenethoxy-γ-quinoline-carboxylic acid-diethyl-amino-ethylene-amide, colorless crystals of melting point 90° C.

(9) α-ethoxy-γ-quinoline-carboxylic acid-diethyl-amino-penta-methylene-amide, colorless crystals of melting point 74° C.

(10) α-n-butoxy-γ-quinoline-carboxylic acid-piperidino-ethylene-amide, colorless crystals of melting point 93° C.

(11) α-methoxy-γ-quinoline-carboxylic acid-diethyl-amino-ethylene-ethyl-amide, a yellowish oil of boiling point 150° C. at 0.008 mm. pressure.

(12) α-propoxy-γ-quinoline-carboxylic acid-diethyl-amino-ethylene-ethyl-amide, a yellowish oil of boiling point 155° C. at 0.008 mm. pressure.

(13) α-n-butoxy-γ-quinoline-carboxylic acid-diethyl-amino-ethylene-ethyl-amide, a yellowish oil of boiling point 163° C. at 0.01 mm. pressure.

(14) α-n-amoxy-γ-quinoline-carboxylic acid-diethyl-amino-ethylene-ethyl-amide, a yellowish oil of boiling point 175° C. at 0.02 mm. pressure.

(15) α-cyclohexoxy-γ-quinoline-carboxylic acid-diethyl-amino-ethylene-ethyl-amide, a yellowish oil of boiling point 185° C. at 0.015 mm. pressure.

(16) α-benzoxy-γ-quinoline-carboxylic acid-triethylethylenediamide, a yellowish oil, of boiling point 192° C. at 0.01 mm. pressure.

(17) α-butoxy-γ-quinoline-carboxylic acid-N-methylpiperizide, colorless crystals of melting point 145° C.

(18) α-ethoxy-γ-quinoline-carboxylic acid-bis-(diethyl-amino-ethylene)-imide, a yellowish oil of boiling point 165° C. at 0.01 mm. pressure.

The compounds of the foregoing table correspond with the following formulas:

What I claim is:

1. A process for the manufacture of substituted basic derivatives of quinoline carboxylic acids by causing an acid halide or an α-halogen-γ-quinoline-carboxylic acid, to react with a base of the formula

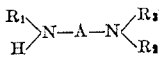

wherein A represents an alkylene radical containing at least two carbon atoms, $R_1$ stands for hydrogen, alkyl or dialkylaminoalkyl, and $R_2$ and $R_3$ for alkyl, and wherein $R_1$ and $R_3$ or $R_2$ and $R_3$ may also stand for an alkylene chain to form a heterocyclic six member ring in which one or two of the N-atoms will be part of the ring.

2. A process for the manufacture of substituted basic derivatives of quinoline carboxylic acids by causing an acid halide of an α-halogen-γ-quinoline-carboxylic acid to react with a base of the formula

wherein $R_1$ stands for hydrogen, alkyl or dialkylaminoalkyl, and $R_2$ and $R_3$ for alkyl, and wherein $R_1$ and $R_3$ or $R_2$ and $R_3$ may also stand for an alkylene chain to form a heterocyclic six member ring in which one or two of the N-atoms will be part of the ring.

3. A process for the manufacture of substituted basic derivatives of quinoline carboxylic acids by causing an acid halide of an α-halogen-γ-quinoline-carboxylic acid to react with a base of the formula

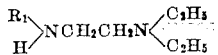

wherein $R_1$ stands for hydrogen, alkyl or dialkylaminoalkyl.

4. A process for the manufacture of substituted basic derivatives of quinoline carboxylic acids by causing an acid halide of an α-halogen-γ-quinoline-carboxylic acid, to react with a base of the formula

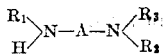

wherein A represents an alkylene radical containing at least two carbon atoms, $R_1$ stands for hydrogen, alkyl or dialkylaminoalkyl, and $R_2$ and $R_3$ for alkyl, and wherein $R_1$ and $R_3$ or $R_2$ and $R_3$ may also stand for an alkylene chain to form a heterocyclic six member ring in which one or two of the N-atoms will be part of the ring, and causing the basically substituted amides of the halogen-quinoline-carboxylic acid thus obtained to react with compounds of the formula R.OH, R standing for the monovalent radicals alkyl, alkylene, phenylalkyl, phenyl or hydrophenyl.

5. A process for the manufacture of substituted basic derivatives of quinoline carboxylic acids by causing an acid halide of an α-halogen-γ-quinoline-carboxylic acid to react with a base of the formula

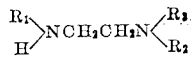

wherein $R_1$ stands for hydrogen, alkyl or dialkylaminoalkyl, and $R_2$ and $R_3$ for alkyl, and wherein $R_1$ and $R_3$ or $R_2$ and $R_3$ may also stand for an alkylene chain to form heterocyclic six member rings in which one or two of the N-atoms will be part of the ring, and causing the basically substituted amides of the halogen-quinoline-carboxylic acid thus obtained to react with compounds of the formula $$R.OH$$

R standing for the monovalent radicals alkyl, alkylene, phenylalkyl, phenyl or hydrophenyl.

6. A process for the manufacture of substituted basic derivatives of quinoline carboxylic acids by causing an acid halide of an α-halogen-γ-quinoline-carboxylic acid to react with a base of the formula

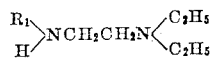

wherein $R_1$ stands for hydrogen, alkyl or dialkylaminoalkyl, and causing the basically substituted amides of the halogen-quinoline-carboxylic acid thus obtained to react with compounds of the formula R.OH, R standing for the monovalent radicals alkyl, alkylene, phenylalkyl, phenyl or hydrophenyl.

7. As new products basically substituted alkylene amides of γ-quinoline-carboxylic acids of the general formula

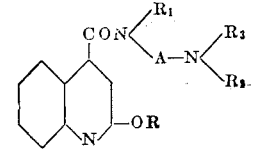

wherein A represents an alkylene radical containing at least two carbon atoms, $R_1$ stands for hydrogen, alkyl or dialkylaminoalkyl, and $R_2$ and $R_3$ for alkyl, and wherein $R_1$ and $R_3$ or $R_2$ and $R_3$ may also stand for an alkylene chain to form heterocyclic six member rings in which one or two of the N-atoms will be part of the ring, and wherein R stands for the monovalent radicals alkyl, alkylene, phenylalkyl, phenyl or hydrophenyl, which products are useful in therapeutics.

8. As new products basically substituted alkylene amides of γ-quinoline-carboxylic acids of the general formula

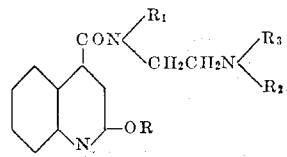

wherein $R_1$ stands for hydrogen, alkyl or dialkylaminoalkyl, and $R_2$ and $R_3$ for alkyl, and wherein $R_1$ and $R_3$ or $R_2$ and $R_3$ may also stand for an alkylene chain to form heterocyclic six member rings in which one or two of the N-atoms will be part of the ring, and wherein R stands for the monovalent radicals alkyl, alkylene, phenylalkyl, phenyl or hydrophenyl, which products are useful in therapeutics.

9. As new products basically substituted alkylene amides of γ-quinoline-carboxylic acids of the general formula

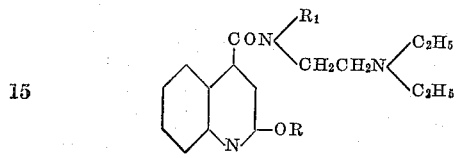

wherein $R_1$ stands for hydrogen, alkyl or dialkylaminoalkyl and R for the monovalent radicals alkyl, alkylene, phenylalkyl, phenyl or hydrophenyl, which products are useful in therapeutics.

10. As new products basically substituted alkylene amides of γ-quinoline-carboxylic acids of the general formula

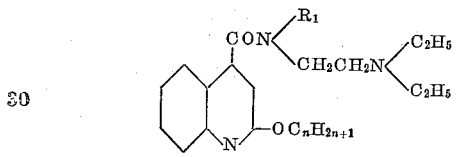

wherein $R_1$ stands for hydrogen, alkyl or dialkylaminoalkyl and $n$ means a whole number, which products are useful in therapeutics.

11. As new products basically substituted alkylene amides of the α-butoxy-γ-quinoline-carboxylic acid of the general formula

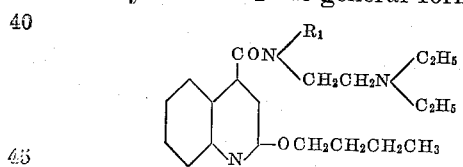

wherein $R_1$ stands for hydrogen or alkyl, which products are useful in therapeutics.

12. As a new product α-butoxy-γ-quinoline-carboxylic acid diethyl-amino-ethylene-amide of the formula

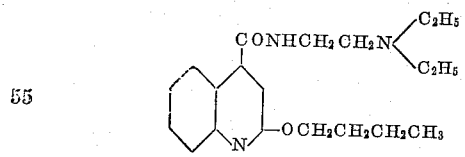

crystallizing from petroleum ether in colorless crystals, melting at 64° C., soluble in organic solvents and forming neutral salts with acids, soluble in water, which product is useful in therapeutics.

In witness whereof I have hereunto signed my name this 10th day of December 1927.

KARL MIESCHER.